United States Patent [19]

Rice, Jr. et al.

[11] Patent Number: 4,575,864
[45] Date of Patent: Mar. 11, 1986

[54] DIGITAL PROGRAMMABLE PACKET SWITCH SYNCHRONIZER

[75] Inventors: Robert P. Rice, Jr.; Larry J. Fruit, both of Seminole; Gary B. Trout, St. Petersburg, all of Fla.

[73] Assignee: E-Systems, Inc., Dallas, Tex.

[21] Appl. No.: 473,104

[22] Filed: Mar. 7, 1983

[51] Int. Cl.$^4$ ............................................. H04L 7/06
[52] U.S. Cl. ....................................... 375/116; 375/96; 364/728
[58] Field of Search ............... 375/106, 111, 114, 116, 375/118, 96; 370/100, 105, 106; 340/146.2; 371/42; 364/728, 604

[56] References Cited

U.S. PATENT DOCUMENTS

| | | | |
|---|---|---|---|
| 3,525,813 | 8/1970 | Taylor et al. | 375/116 |
| 3,537,069 | 10/1970 | Van De Houten | 375/116 |
| 3,562,710 | 2/1971 | Halleck | 375/116 |
| 3,801,956 | 4/1974 | Braun et al. | 375/116 |
| 3,947,672 | 3/1976 | Harrison et al. | 364/728 |
| 4,016,368 | 4/1977 | Apple, Jr. | 375/116 |
| 4,370,726 | 1/1983 | Caracappa | 364/728 |
| 4,400,790 | 8/1983 | Chambers et al. | 375/96 |
| 4,412,301 | 10/1983 | Strubeck | 364/604 |
| 4,414,676 | 11/1983 | Kraul et al. | 375/116 |

Primary Examiner—Robert L. Griffin
Assistant Examiner—Stephen Chin
Attorney, Agent, or Firm—Albert M. Crowder, Jr.

[57] ABSTRACT

A digital programmable packet switch synchronizer receives a digital input data stream which includes a unique digital word. The unique digital word is stored in the synchronizer in a random access memory. A group of the most recently received data bits are stored in memory along with a blanker bit for each data bit. The blanker bit determines the valid or invalid status of the data bit. During each bit period of the incoming data stream, the stored data bits are serially compared with the stored unique word. A count is made of the number of noncomparisons between the stored data bits and the stored unique word bits when the data bit is valid. If the number of noncomparisons does not exceed a programmed error limit, an output signal is generated to indicate detection of the unique word. A similar count is carried out for detection of the inverse to the unique word. The number of invalid blanker bits for the data bits is also counted and if this count exceeds a programmed limit, the detection of the unique word is inhibited. When the positive of the unique word is detected, the incoming data is transmitted to an output terminal with a positive logic sense. But if the inverse of the unique word is detected, the incoming data is inverted and transmitted to the output terminal. In either case, the incoming data is transmitted to the output terminal with the correct polarity.

16 Claims, 5 Drawing Figures

DIGITAL PROGRAMMABLE PACKET SWITCH SYNCHRONIZER

TECHNICAL FIELD

The present invention pertains to digital communications and in particular to the detection of a unique digital word to provide synchronization in packet communications.

BACKGROUND OF THE INVENTION

Packet communication networks are rapidly becoming a major vehicle for the transmission of digital data. These networks allow the sharing of expensive resources among a collection of "bursty" users and are especially well suited for the unique nature of computer-based communications. A packet is a collection of data bits which can be up to a few thousand bits in length. Each packet contains the necessary addressing and control information to allow the proper routing of the data through the network. A synchronization word, or unique word, is included in each data packet to enable a receiver such as in a satellite communication (SATCOM) system to acquire proper timing. The probability of successful acquisition by the receiving system is directly tied to the "uniqueness" of the synchronization word with respect to other data patterns and to the capabilities of the synchronization circuit.

The synchronization circuit must be able to distinguish synchronization words from random noise, radio frequency interference (RFI), and modem preamble bit patterns. Synchronization circuits, to be truly effective, must be flexible in the following areas:
(1) synchronization word lengths,
(2) correlation error tolerance,
(3) synchronization word bit patterns, and
(4) blanking pulse length tolerance.

Therefore there exists a need for a programmable synchronization word detector for packet type communications wherein the detector is adaptable for different synchronization word types and lengths, has a variable maximum error rate and can reject data when there is intense RFI.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
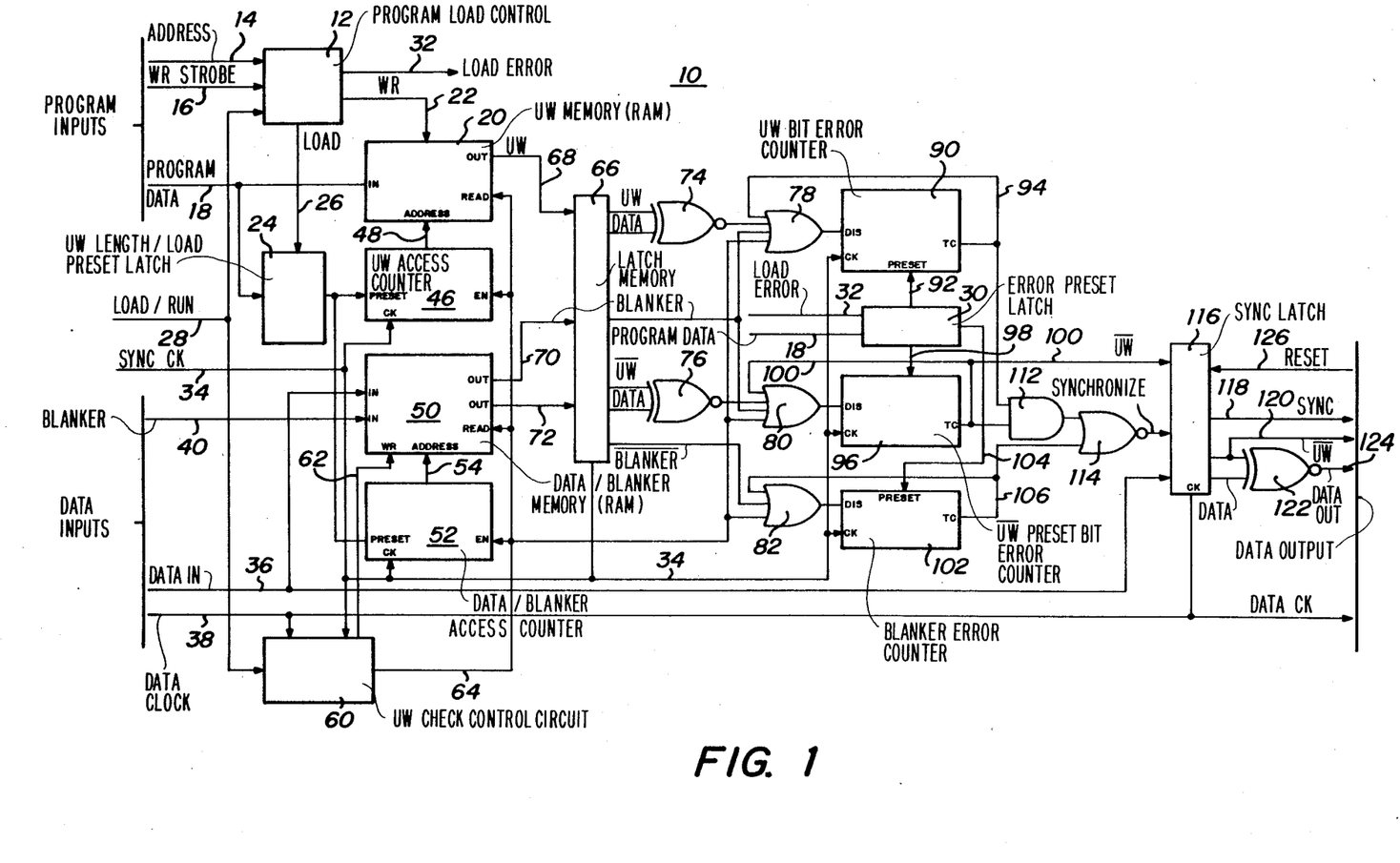
FIG. 1 is a block and schematic diagram which illustrates the synchronization detector of the present invention.

A synchronization detector circuit for packet communications is illustrated in FIG. 1 and is designated generally by the reference numeral 10. The purpose of circuit 10 is to detect a unique digital synchronization word at the start of a packet of digital information. The circuit 10 receives a digital data stream input and must generate a synchronization output signal when the unique word is detected.

At the start of operation, circuit 10 is loaded with program inputs to define parameters for detecting the unique digital synchronization word. The loading of the program inputs is controlled by a program word control circuit 12. The address for a program parameter is provided through a line 14. A write strobe signal is provided through a line 16. The actual programmed data is provided through a line 18. Each of the lines described herein may in fact be a parallel bus.

The unique digital word which is the synchronization word is input through line 18 into a random access memory 20. A write line 22 from load control circuit 12 provides the address and write command to enter the unique digital word into the memory 20. The length of the unique digital word is stored in a unique word length/load preset latch circuit 24. Circuit 24 is operated under the control of a load command received through a line 26 from control circuit 12.

The program load control circuit 12 is activated when a load command is entered on a load/run line 28. Circuit 10 is operated to detect the unique digital word when a run command is entered into line 28.

A synchronization clock signal is input on a line 34 to the circuit 10.

Further inputs to the circuit 10 are the error limit parameters. An error limit parameter is provided for the unique digital word, optionally for the inverse of the unique digital word, and for a blanker signal. The error parameters are transmitted through the program data line 18 which is an input to an error preset latch 30. A load error control line 32 is connected between the control circuit 12 and the latch 30 for controlling the loading of the error parameters into the latch 30.

Data inputs are supplied to the circuit 10 when it is in the run mode. The digital data stream which contains the packets of information is input on a line 36. A corresponding data clock signal is input on a line 38.

The blanker signal is input to circuit 10 on a line 40 to indicate whether the concurrently received data should be considered to be valid or invalid. A typical application of the blanker signal would be in a shipboard application in which a high power radar is operating. The blanker signal would go to an invalid status when the pulses of the radar are transmitted since the radar pulses have such a high power level that they can easily interfere with the received digital data.

A unique word access counter 46 is connected to receive inputs from the latch 24 and the synchronization clock signal on line 34. Counter 46 generates memory addresses which are transmitted through a line 48 to the unique word memory 20.

The incoming data and blanker signals through lines 36 and 40 are input to a data/blanker memory 50. The read and write addresses for memory 50 are generated by a counter 52 which supplies the addresses through a line 54.

A unique word check control circuit 60 sequences the operation of circuit 10 in the run mode. Circuit 60 is itself activated by the run signal received through line 28. The sequence of actions by circuit 60 are regulated by the data clock signal received through line 38 and the synchronization clock signal received through line 34. Circuit 60 controls the writing of information into memory 50 through a line 62. Circuit 60 controls through line 64 the reading of memories 20 and 50 and the enabling of counters 46 and 52.

A memory latch 66 receives a unique word bit through a line 68 from memory 20, receives a blanker bit through a line 70 from memory 50 and receives a data bit through a line 72 from memory 50. The latch 66 is activated by clock signals received from the synchronization clock through line 34.

The unique word bit in latch 66 is provided as a first input to an exclusive NOR gate 74. The data bit in latch 66 is provided as the second input to gate 74. An inverse bit of the unique word bit is provided by the latch 66 as the first input to an exclusive NOR gate 76. The data bit from latch 66 is provided as the second input to gate 76.

The blanker bit from latch 66 is provided as a first input to OR gates 78 and 80. The outputs from gates 74 and 76 provide respective second inputs to gates 78 and 80. Gates 78 and 80 further receive an enabling command from circuit 60 through line 64.

A further OR gate 82 receives an inverse of the blanker signal from latch 66 as a first input. A second input is the enable signal received through line 64 from circuit 60.

A unique word bit error counter 90 has the disable input thereof connected to the output of gate 78. The synchronization clock signal is received through line 34 at the clock input. The counter is preset to the unique word error limit parameter which is received at the preset input terminal through a line 92. An output signal is generated at the terminal count (TC) of counter 90 when the maximum count of the counter is reached. The TC terminal of counter 90 is connected to a line 94 which provides a final input to the OR gate 78. When the terminal count is reached, the signal generated on line 94 serves to latch the circuit comprising gate 78 and counter 90.

An inverse unique word bit error counter 96 has the disable input terminal connected to receive the output signal from gate 80. The clock input is connected to receive the synchronizing clock signal through line 34. The starting count for the counter 96 is received through a line 98 from the latch 30. When the terminal count of counter 96 is reached, an output signal is generated at the TC terminal and is transmitted through a line 100 to serve as the final input to OR gate 80. This terminal count signal serves to latch the circuit comprising OR gate 80 and counter 96.

A blanker error counter 102 receives the output of gate 82 at the disable input terminal and the synchronizer clock signal through line 34 at the clock input. The blanker error limit parameter is transferred from latch 30 through a line 104 to preset the counter. When the terminal count of counter 102 is reached, an output signal is generated at the TC terminal. The TC terminal of counter 102 is connected to a line 106 which provides a further input to the OR gate 82 and serves to latch the circuit consisting of OR gate 82 and counter 102 when the terminal count is reached.

An AND gate 112 has line 94 from counter 92 connected to the first input and line 100 from counter 96 connected to the second input thereof. The output from gate 112 is connected as the first input to a NOR gate 114. The second input to gate 114 is the output of counter 102 which is transmitted through line 106.

A sync latch 116 receives the output of counter 96 through line 100, the output of NOR gate 114 and the input digital data stream through line 36. Latch 116 is operated in sequence with the data clock signal received through line 38.

When circuit 10 detects the unique digital word in the data stream, the output of gate 114 is driven high and this state is latched by circuit 116 which then provides an output signal to a line 118. Detection of the inverse of the unique digital word is indicated by generating an output signal on a line 120. The input data is clocked through latch 116 to a first input of an exclusive NOR gate 122. The input data is transmitted through gate 122 in positive form if the positive of the unique digital word has been detected. The input data is inverted and provided to the output terminal 124 when the inverse of the unique digital word is detected by circuit 10. The latch 116 is reset by an external command received through line 126.

The operation of circuit 10 is now described in reference to FIG. 1. Circuit 10 is initially set up for operation by inputting a load signal through line 28. The addresses for control parameters are provided through line 14 and the parameters themselves are input through line 18. The loading of the parameters is controlled by the program load control circuit 12 after pulsing the write strobe signal line 16. The unique digital word utilized to detect synchronization is loaded into memory 20. The length of the unique digital word is loaded into latch 24. A unique word error limit parameter is loaded into latch 30. A corresponding or different error limit parameter is also loaded into latch 30 for detecting the inverse of the unique word. A blanker limiting parameter is further loaded into latch 30. In the operation of the embodiment illustrated in FIG. 1, the limiting parameters are utilized as the starting point in the respective counters 90, 96 and 102.

The circuit 10 is transferred to an operational mode by inputting a run command on line 28. The blanker signal is provided to line 40 and the digital data stream is input through line 36. During each data clock period, the concurrent data bit is stored in memory 50 together with the corresponding state of the blanker signal. The stored blanker bit determines the valid or invalid status of the corresponding data bit. The memory 50 is utilized to store the same number of data bits as there are bits in the unique digital word. Only the most recently received data bits are stored in memory 50. As each new data bit is received, the oldest data bit is deleted.

After a new data bit is received, the oldest stored data bit is read from memory 50 by an address generated by counter 52. This bit is then output through line 70 to be stored in memory latch 66. At this same time, the first bit of the unique digital word is read out of memory 20 at an address generated by the counter 46. This bit of the unique digital word is also input to the memory latch 66. The blanker bit corresponding to the data bit is also read out of memory 50 and input to latch 66. In the next step, the same bits for the next oldest stored data bit are read out and transferred to the latch 66. This is continued until all of the stored data bits, blanker bits and unique digital word bits are read out of memory. This complete serial operation occurs during one bit period of the digital data stream in response to the synchronization clock which runs at a faster rate than the data clock. The synchronization clock runs at a minimum rate of (number of unique word bits plus five) times the data clock rate.

The latch 66 generates the inverse of the unique digital word bit and that bit together with the positive bit of the unique digital word are stored along with the data and blanker bits. Latch 66 also generates and stores the inverse of the blanker bit.

The data and unique digital word bits are input to logic gates 74 and 76. Gate 74 compares the unique digital word bit with the data bit while gate 76 compares the inverse of the unique digital word bit with the data bit. If the unique digital word bit does not compare with the data bit, gate 74 provides an output to gate 78. Likewise, if the inverse of the unique digital word bit does not compare with the data bit, an input signal is provided from gate 76 to gate 80. The corresponding blanker bit for the data bit is input to both of the gates 78 and 80 to disable corresponding error counters 90 and 96 from counting when the data bit has been designated to be invalid.

For each noncomparison between the unique digital word bit and the data bit, the output from gate 78 causes the counter 90 to be incremented. Likewise, whenever there is a noncomparison between the inverse of the unique digital word bit and the data bit, the output of gate 80 causes the counter 96 to be incremented. The counter 102 is incremented for each blanker bit (invalid data bit) received.

The counter 90 is set at an initial state by the latch 30. The initial state is the error limit parameter for the unique digital word. The counter is incremented upward to reach a terminal count. If the terminal count for counter 90 is reached, it is determined that the unique data word has not been detected. Likewise, if the terminal count for counter 96 is reached, it is determined that the inverse of the unique digital word has not been detected. Therefore, the maximum number of noncomparisons allowed is the difference between the terminal count minus 1 of the counters and the initial error limit parameter. The counters, of course, could be designed to start at an initial zero state and count up to the error limit parameter and the input error parameter minus 1 would then correspond to the maximum allowed number of noncomparisons.

The AND gate 112 generates an output if either the unique word or its inverse is detected. The NOR gate 114 generates a detection-of-synchronization output signal when the output of gate 112 indicates that the unique word or its inverse has been detected and the counter 102 has not reached its terminal count. Whenever the counter 102 reaches terminal count, the gate 114 is disabled and the output of AND gate 112 is ignored.

The sync latch 116 receives the output of gate 114 to determine whether the unique digital word or its inverse has been detected. The determination of which of these two has been detected is indicated by the signal state at line 100. The original digital data is received through line 36.

When the synchronization word, either the positive or the inverse, has been detected, an output signal will be generated on the sync line 118. If the positive of the unique digital word has been detected, the output data will be transmitted to the output line 124 in the same logical state as it was received. However, if the inverse of the unique digital word is detected, the incoming digital data stream is inversed by the state on line 120 to the second input of the exclusive NOR circuit 122. If the synchronization word is inverted, then the data itself is inverted. Therefore, in either case, the correct polarity of output data is provided to line 124.

The circuit 10 provides the above sequence of comparisons for each bit of the store unique digital word during each bit period of the received digital data stream. The comparison of the stored bits of the digital data stream is carried out serially with the stored bits of the unique digital word. This procedure is in sharp contrast with the conventional detection scheme in which the stored unique digital word is compared in parallel with the digital data stream. The circuit of the present invention offers substantial advantages over the parallel functioning circuitry of the prior art. Principally, a substantially fewer number of components are required to carry out the correlation process of the present invention. Further, the various parameters including the unique word, its length and the error limit parameters can easily be programmed into the circuit without any change in the hardware.

The speed of operation of circuit 10 is enhanced by use of a "pipelining" technique. A number of the operations of the circuit are carried out concurrently so that the circuit can process the information at the fastest rate. The following steps occur at essentially the same time. The addresses are generated for one set of bits. The comparisons and noncomparisons are made for a previously read out set of bits. And, the results of the incrementing of the counters are latched for a still earlier set of bits. In a design example of the present invention, the unique word has been made 74 bits long. The 74 bits of the unique word are serially compared with the 74 most recently received data bits to determine if the unique digital word has occurred in the data stream. The 74 steps of comparison are carried out during one bit period of the digital data stream.

Figure 2A:
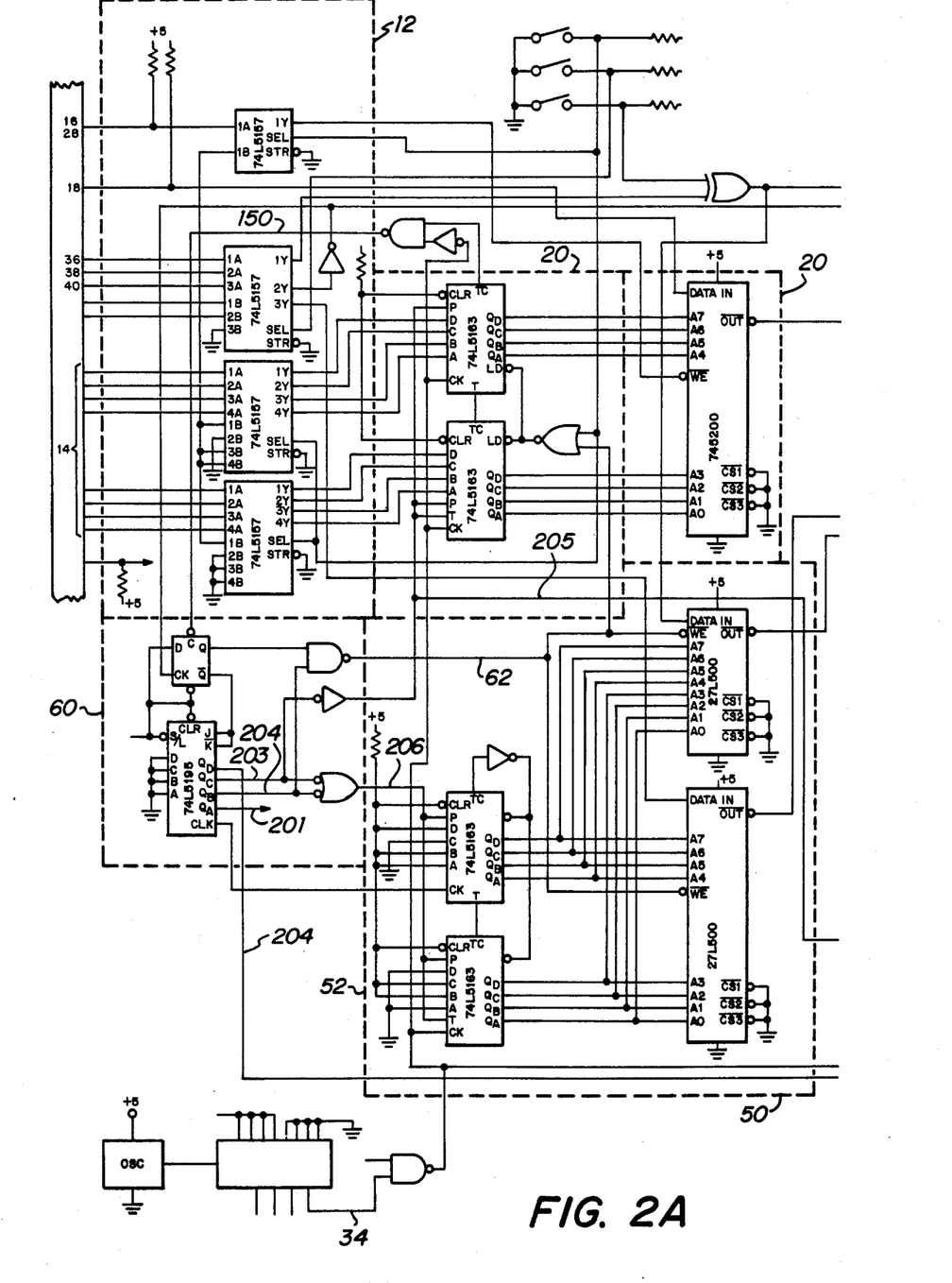
FIGS. 2A and 2B are schematic illustrations of a selected embodiment of the synchronizer of the present invention.
Figure 2B:
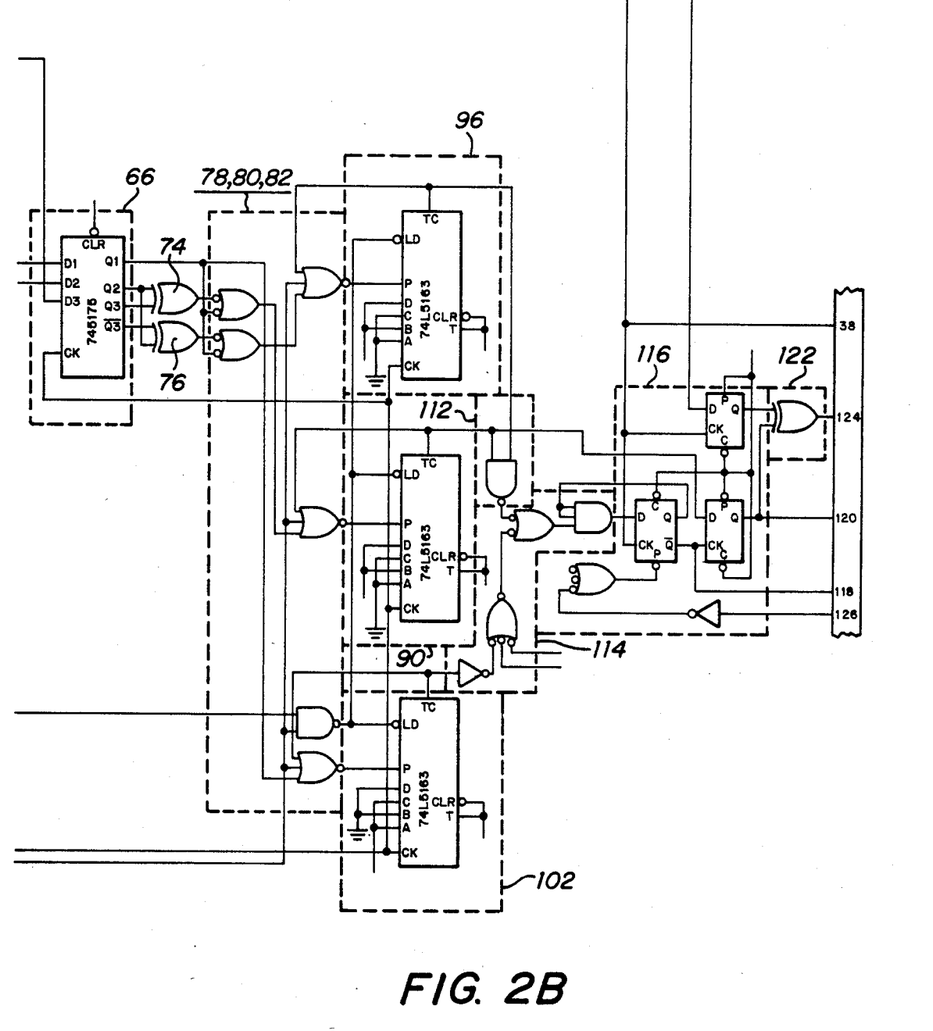

A detailed logic diagram of the circuit of the present invention is illustrated in FIGS. 2A and 2B. This is a detailed implementation of the major portion of the block diagram circuit illustrated in FIG. 1. The circuit elements in FIGS. 2A and 2B are grouped within dashed lines which are designated with the reference numerals corresponding to the blocks shown in FIG. 1. Corresponding reference numerals are also utilized for the inputs, outputs and signal paths.

Figure 3:
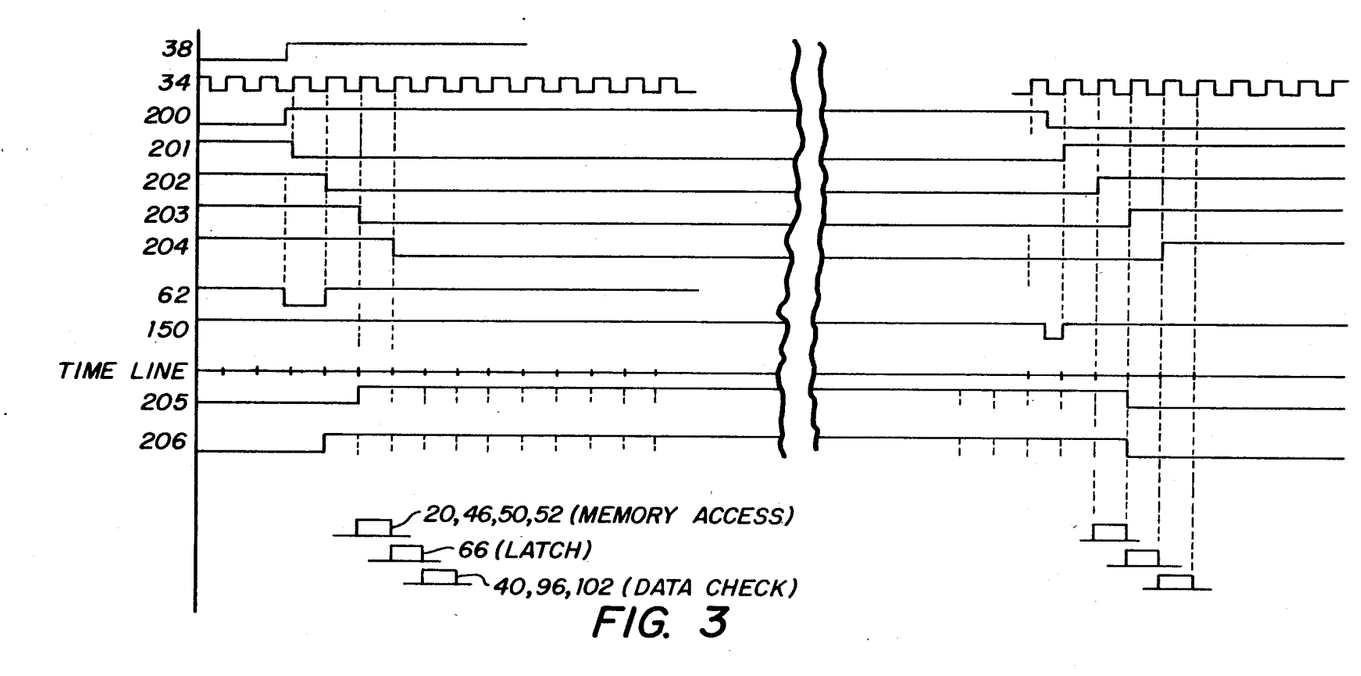
FIGS. 3 and 4 are timing diagrams which illustrate the operation of the circuit shown in FIGS. 2A and 2B.
Figure 4:
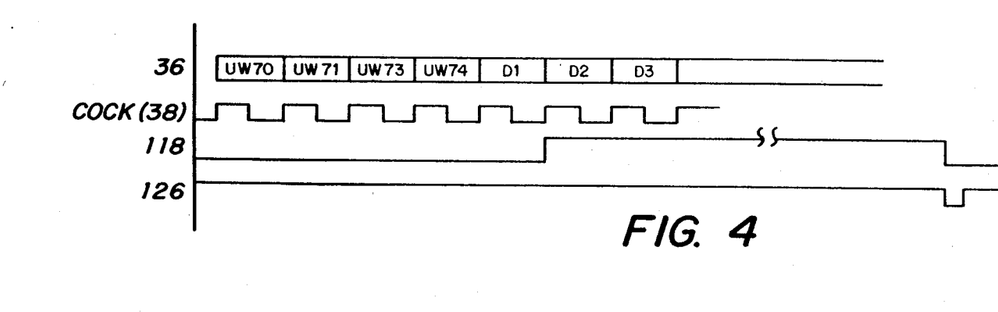

A timing diagram is shown in FIG. 3 to illustrate the sequence of operation for the circuit shown in FIG. 2.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

We claim:

1. A method for detecting a unique digital word in a digital data stream, comprising the steps of:
    (a) storing a representative sample of said unique digital word;
    (b) storing a preset number of the most recently received data bits of said digital data stream;
    (c) receiving and storing a new data bit of said digital data stream in said most recently received data bits and displacing an oldest bit thereof;
    (d) in response to the storing of a new data bit, comparing a first bit of said unique digital word with an oldest bit of said most recently received data bits as modified in step (c);
    (e) repeating step (d) for each subsequent bit, from said first bit, of said unique digital word and each next oldest bit, from said oldest bit, of said most recently received bits as modified in step (c) until a last bit of said unique digital word has been compared to said new data bit;

(f) evaluating the results of said comparisons to determine if the stored data stream bits correlate with the stored unique digital word bits exceeding a preset threshold; and (g) if said stored data stream bits do not correlate with the stored unique digital word bits exceeding the preset threshold, repeating steps (c)-(f); and (h) if said stored data stream bits do correlate with the stored unique digital word bits exceeding the preset threshold, generating an output signal to indicate detection of said unique digital word within said digital data stream.

2. The method recited in claim 1 wherein the number of bits stored for said digital data stream is equal to the number of bits in said unique digital word.

3. A method for detecting a unique digital data word in a digital data stream, comprising the steps of:

storing a representative sample of said unique digital word;

storing a preset number of the most recently received bits of said digital data stream;

receiving and storing a concurrently received data bit of said digital data stream in said most recently received data bits and displacing an oldest bit thereof;

receiving a blanker signal having a first state designating that the concurrently received bit of said digital data stream is valid and a second state designating that the concurrently received bit of the digital data stream is invalid;

storing a blanker bit corresponding to each stored bit of said digital data stream, each blanker bit designating a valid or invalid state of the corresponding bit of said digital data stream;

for each concurrently received bit, serially comparing the valid state stored data stream bits, beginning with an oldest bit thereof, with serial bits of the representative sample of said unique digital word, beginning with a first bit thereof, until the concurrently received bit of said most recently received bits has been compared to a last bit of said unique digital word, said comparisons occurring during a bit period of said digital data stream;

evaluating the results of the step of serially comparing to determine if the stored data stream bits correlate with the stored unique digital word bits exceeding a preset threshold;

counting the number of blanker bits which correspond to said stored digital data stream bits and indicate invalid states; and generating an output signal to indicate detection of said unique digital word when said correlation exceeds said preset threshold and the number of blanker bits does not exceed a preset limit.

4. The method recited in claim 3 wherein the number of stored bits of said digital data stream and the number of said stored blanker bits is each equal to the number of bits in said unique digital data word.

5. A method for detecting a unique digital word in a digital data stream, comprising the steps of:

(a) storing a representative sample of said unique digital word;

(b) storing a preset number of the most recently received data bits of said data stream;

(c) receiving and storing a new data bit of said digital data stream in said most recently received data bits and displacing an oldest bit thereof;

(d) in response to the storing of a new data bit, comparing a first bit of said unique digital word with an oldest bit of said most recently received data bits as modified in step (c);

(e) repeating step (d) for each subsequent bit, from said first bit, of said unique digital word and each next oldest bit, from said oldest bit, of said most recently received bits as modified in step (c) until a last bit of said unique digital word has been compared to said new data bit;

(f) counting a number of noncomparisons resulting from the comparisons in steps (d)-(e);

(g) if the number count of said noncomparisons is greater than a preset threshold, repeating steps (c)-(f);

(h) generating an output signal to indicate detection of said unique digital word when the number count of said noncomparisons is less than a preset threshold number.

6. The method recited in claim 5 wherein the number of said stored data stream bits is equal to the number of bits in said unique digital word.

7. The method recited in claim 5 including the steps of:

(i) in response to the storing of a new data bit, comparing a first bit of an inverse of said unique digital word with an oldest bit of said most recently received data bits as modified in step (c);

(j) repeating step (i) for each subsequent bit, from said first bit, of said inverse of said unique digital word and each next oldest bit, from said oldest bit, of said most recently received bits as modified in step (c) until a last bit of said inverse of said unique digital word has been compared to said new data bit;

(k) counting a number of noncomparisons resulting from the comparisons in steps (i)-(j); and (l) generating a second output signal to indicate detection of the inverse of said unique digital word when the number of said noncomparisons between said stored bits of said digital data stream and the inverse bits of said unique digital word is less than a second preset threshold number.

8. A method for detecting a unique digital word in a digital data stream, comprising the steps of:

storing a representative sample of said unique digital word;

storing a preset number of the most recently received bits of said digital data stream;

receiving and storing a concurrently received data bit of said digital data stream in said most recently received data bits and discarding an oldest bit thereof;

receiving a blanker signal having a first state designating that the concurrently received bit of said digital data stream is valid and a second state designating that the concurrently received bit of said digital data stream is invalid;

storing a blanker bit corresponding to each stored bit of said digital data stream, each blanker bit designating a valid or invalid state of the corresponding bit of said digital data stream;

for each concurrently received bit, serially comparing the valid stored data stream bits, beginning with an oldest bit thereof, with serial bits of the representative sample of said unique digital word, beginning with a first bit thereof, until the concurrently received bit of said most recently received bits has been compared to a last bit of said unique digital word, said comparisons occurring during a bit period of said digital data stream;

counting a number of noncomparisons resulting from the step of serially comparing said stored bits of said digital data stream and the bits of said unique digital word;

counting a number of blanker bits which correspond to said stored digital data stream bits and indicate invalid states; and generating an output signal to indicate detection of said unique word in the digital data stream when the number count of noncomparisons is less than a preset threshold number and the number of blanker bits does not exceed a preset limit.

9. The method recited in claim 8 including the steps of:

for each concurrently received bit, serially comparing the valid stored data stream bits, beginning with an oldest bit thereof, with serial bits of an inverse of the representative sample of said unique digital word, beginning with a first bit thereof, until said concurrently received bit has been compared to a last bit of said inverse of said unique digital word, said comparisons occurring during a bit period of said digital data stream;

counting a number of noncomparisons resulting from the step of serially comparing said valid state stored bits of said digital data stream and the inverse of the bits of said unique digital word; and generating an output signal to indicate detection of the inverse of said unique digital word when the number of said noncomparisons between said stored bits of said digital data stream and the inverse of the bits of said unique digital word is less than a second preset threshold number and the number of blanker bits does not exceed a second preset limit.

10. A method for detecting a unique digital word in a digital data stream, comprising the steps of:

storing a representative sample of said unique digital word in a first memory location;

storing a threshold number;

presetting a unique word counter and an inverse unique word counter to said threshold number at the beginning of a bit period of said digital data stream;

storing a blanker limit number;

presetting a blanker counter to said limit number at the start of said bit period;

storing a number of the most recently received bits of said digital data stream in a second memory location, the number of said most recently received bits equal to the number of bits in the representative sample of said unique digital word, wherein each newly received bit of said digital data stream is stored and the oldest stored bit of said digital data stream is deleted from storage;

receiving a blanker signal which has a first state designating that the concurrently received bit of said digital data stream is valid and a second state designating that the concurrently received bit of said digital data stream is invalid;

storing a blanker bit corresponding to each stored bit of said digital data stream in a third memory location, each said blanker bit designating a valid or invalid state of the corresponding bit of said digital data stream;

sequentially generating memory addresses for said first, second and third memory locations to read out corresponding bits of said unique digital word, said data stream and said blanker signal, all of said memory addresses generated during each bit period of said digital data stream;

storing the bits read out of said memories in a first latch;

comparing the unique word bit with the data stream bit in said latch;

comparing an inverse of the unique word bit in said latch with the data stream bit in said latch;

in response to the step of comparing the unique word bit with the data stream bit, incrementing said unique word counter for each noncomparison for each said valid state data stream bit;

in response to the step of comparing the inverse of the unique word bit in said latch with the data stream bit in said latch, incrementing said inverse unique word counter for each noncomparison for each said valid state data stream bit;

incrementing said blanker counter for each invalid state blanker bit received by said latch; and setting a second latch to indicate detection of said unique digital word when said unique word counter does not reach a terminal count and said blanker counter does not reach a terminal count or to indicate detection of said inverse unique digital word when said inverse unique digital word counter does not reach a terminal count and said blanker counter does not reach a terminal count.

11. The method recited in claim 10 including the steps of:

transmitting said digital data stream without a logic change to an output terminal when said unique digital word is detected; and inverting and transmitting said digital data stream to said output terminal when said inverse unique digital word is detected.

12. The method recited in claim 10 wherein the steps of generating memory addresses, storing the bits read out of said memories and incrementing the counters take place essentially concurrently to enhance the speed of said method for detecting.

13. Apparatus for detecting a unique digital word in a digital data stream, comprising:

means for storing a representative sample of said unique digital word;

means for storing a set number of the most recently received bits of said digital data stream;

means for receiving and storing a new data bit of said digital data stream in said most recently received data bits and displacing an oldest bit thereof;

means, responsive to said means for receiving and storing a new data bit, for comparing serial bits of said unique digital word, beginning with a first bit thereof, with serial bits of said most recently received data bits, beginning with an oldest bit thereof, until a last bit of said unique digital word has been compared to said new data bit;

means, responsive to said means for comparing, for determining the extent of correlation between said unique digital word and said stored bits of said digital data stream; and means for generating an output signal to indicate detection of said unique digital word when said extent of correlation exceeds a preset threshold.

14. The apparatus recited in claim 13 wherein said means for determining the extent of correlation comprises a first counter which is preset to a start number and incremented for each noncomparison between a bit of said digital data stream and a corresponding bit of said unique digital word, said counter reaching a terminal count to indicate that said extent of correlation has not exceeded said threshold.

15. The apparatus recited in claim 13 including:
- means for serially comparing the stored bits of said digital data stream respectively to an inverse of the stored bits of said unique digital word;
- means, responsive to said means for serially comparing the stored bits of said digital data stream respectively to the inverse of the stored bits of said unique digital word, for determining the extent of correlation between the inverse of said unique digital word and said stored bits of said digital data stream; and
- means for generating a second output signal to indicate detection of the inbverse of said unique digital word when the extent of said correlation between the bits of said digital data stream and the inverse of the bits of said unique digital word exceeds a preset threshold.

16. Apparatus for detecting a unique digital word in a digital data stream, comprising:
- a first memory area for storing said unique digital word;
- a second memory area for storing a set number of the most recently received bits of said digital data stream;
- a third memory area for storing a blanker bit for each of the bits of said digital data stream, each blanker bit indicating a valid or invalid state for the corresponding bit of said digital data stream;
- means for generating memory addresses for serially reading out sets of corresponding bits, one each for said unique data word, said digital data stream and the related blanker bit;
- means for generating an inverse bit of the read out bit of said unique digital word;
- a latch for storing the bits read out from said memory and said inverse bit;
- means for comparing the bits for said unique word and for said digital data stream in said latch;
- means for comparing the bits for said digital data word and said inverse bit in said latch;
- means for counting the number of noncomparisons between the valid status bits of said digital data word and the bits of unique digital word;
- means for counting the number of noncomparisons between the valid status bits and said digital data word and said inverse bits;
- means for counting the number of invalid status blanker bits; and
- means for generating a first output signal indicating detection of said unique digital word when the number of noncomparisons between the valid status bits of said digital data stream and the bits of said unique digital word do not exceed a preset threshold and said count of invalid status blanker bits does not exceed a preset threshold and for generating a second output signal indicating detection of the inverse of said unique digital word when the number of noncomparisons between the valid state bits of said digital data word and said inverse bits does not exceed a preset threshold and said count of invalid status blanker bits does not exceed a preset threshold.

* * * * *